US012111026B2

(12) United States Patent
Van De Sluis et al.

(10) Patent No.: US 12,111,026 B2
(45) Date of Patent: Oct. 8, 2024

(54) LIGHTING DEVICE FOR ILLUMINATING A SURFACE

(71) Applicant: SIGNIFY HOLDING B.V., Eindhoven (NL)

(72) Inventors: Bartel Marinus Van De Sluis, Eindhoven (NL); Michel Cornelis Josephus Marie Vissenberg, Roermond (NL); Marcellinus Petrus Carolus Michael Krijn, Eindhoven (NL); Leendert Teunis Rozendaal, Valkenswaard (NL)

(73) Assignee: SIGNIFY HOLDING, B.V., Eindhoven (NL)

( * ) Notice: Subject to any disclaimer, the term of this patent is extended or adjusted under 35 U.S.C. 154(b) by 0 days.

(21) Appl. No.: 17/768,733

(22) PCT Filed: Oct. 16, 2020

(86) PCT No.: PCT/EP2020/079152
§ 371 (c)(1),
(2) Date: Apr. 13, 2022

(87) PCT Pub. No.: WO2021/074358
PCT Pub. Date: Apr. 22, 2021

(65) Prior Publication Data
US 2024/0142074 A1 May 2, 2024

(30) Foreign Application Priority Data
Oct. 18, 2019 (EP) .................................... 19203984

(51) Int. Cl.
*F21S 10/02* (2006.01)
*F21V 14/04* (2006.01)
(Continued)

(52) U.S. Cl.
CPC ............ *F21S 10/026* (2013.01); *F21V 14/04* (2013.01); *F21Y 2103/10* (2016.08); *F21Y 2107/50* (2016.08); *F21Y 2113/10* (2016.08)

(58) Field of Classification Search
CPC ............................... F21S 10/026; F21V 14/04
See application file for complete search history.

(56) References Cited

U.S. PATENT DOCUMENTS 10,151,447 B2 7/2018 Suzuki et al.
2012/0002409 A1 1/2012 Donauer
(Continued)

FOREIGN PATENT DOCUMENTS

CN 201539750 U 8/2010
CN 104121508 A 10/2014
(Continued)

*Primary Examiner* — William N Harris

(57) ABSTRACT

A lighting device (100) for illuminating a surface (110). The lighting device comprises at least one first light source (120) configured to emit a first light beam (140) in a first direction and at least one second light source (130) configured to emit a second light beam (150) in a second direction that is not parallel to the first direction. The first light beam (140) has a first spectral power distribution, the second light beam (150) has a second spectral power distribution and the second spectral power distribution is different from the first spectral power distribution. The lighting device further comprises at least one light-delimiting element (160) adjustable relative to at least one of the at least one first light source and the at least one second light source. The at least one light-delimiting element is further configured to delimit the first light beam and the second light beam thereby modify an area of overlap on the surface (110) of the first light beam (140) and the second light beam (150) by forming a boundary of the light (170) separating the first light beam and the second light beam, such that the first light source is configured to illuminate at least a first region (180) of the
(Continued)

surface, and the second light source is configured to illuminate at least a second region (190) of the surface adjoining the at least one first region of the surface.

15 Claims, 5 Drawing Sheets

(51) Int. Cl.

| | |
|---|---|
| ***F21Y 103/10*** | (2016.01) |
| ***F21Y 107/50*** | (2016.01) |
| ***F21Y 113/10*** | (2016.01) |

(56) References Cited

U.S. PATENT DOCUMENTS

| | | | | |
|---|---|---|---|---|
| 2013/0170201 | A1 | 7/2013 | Chen | |
| 2014/0016322 | A1* | 1/2014 | Lu | F21V 7/0008 362/282 |
| 2016/0102824 | A1 | 4/2016 | Torres et al. | |
| 2018/0038573 | A1 | 2/2018 | Mealey | |
| 2018/0128453 | A1 | 5/2018 | Yuan et al. | |
| 2019/0186714 | A1 | 6/2019 | Bergman et al. | |
| 2019/0320514 | A1* | 10/2019 | Edwards | F21V 23/0435 |
| 2022/0178516 | A1* | 6/2022 | Belliveau | F21V 7/06 |

FOREIGN PATENT DOCUMENTS

| | | | |
|---|---|---|---|
| CN | 108778775 | A | 11/2018 |
| CN | 208983094 | U | 6/2019 |
| DE | 202011003261 | U1 | 4/2011 |
| KR | 101610187 | B1 | 4/2016 |
| WO | 2011037767 | A2 | 3/2011 |
| WO | 2015085050 | A1 | 6/2015 |

* cited by examiner

LIGHTING DEVICE FOR ILLUMINATING A SURFACE

CROSS-REFERENCE TO PRIOR APPLICATIONS

This application is the U.S. National Phase application under 35 U.S.C. § 371 of International Application No. PCT/EP2020/079152, filed on Oct. 16, 2020, which claims the benefit of European Patent Application No. 19203984.0, filed on Oct. 18, 2019. These applications are hereby incorporated by reference herein.

FIELD OF THE INVENTION

The present invention generally relates to lighting devices comprising light beam delimiters. More specifically, the present invention relates to the adjustment of light beam delimiters to obtain a desired lighting effect.

BACKGROUND OF THE INVENTION

The use of fixed structures or barn doors for delimiting the light beam of a spotlight, lamp or light fixture represents a widely used technique for applications such as theaters, concerts, large venues, etc. These fixed structures provide numerous advantages such as being completely light absorbing thus allowing sharp edges to be created around the light beam which the structures are delimiting.

Additionally, light fixtures with individual controllable light sources, used in combination with fixed structures, continue to attract great interest. Individually controllable light sources enable the creation of color gradients of a light beam and it is appreciated and desired to have a lighting equipment enabling light beams capable of illuminating a surface or a plurality of surfaces with different colors.

However, as these lighting equipment may comprise several light sources, a sharp and distinct light separation between different light effects or different colors of the gradients of the light beams is highly difficult to obtain. Although the edges of the light beams may be more defined by the fixed structures, a clear division of the light effect is currently lacking when resorting to said fixed structures.

Hence, it is an object of the present invention to try to overcome at least some of the deficiencies of present fixed structures regarding their capacity to enable a distinct light separation between different light effects.

SUMMARY OF THE INVENTION

It is therefore of interest to overcome at least some of the deficiencies stated above, in order to improve the separation of light generated by the individually controllable light sources.

This and other objects are achieved by providing a lighting device having the features in the independent claim. Preferred embodiments are defined in the dependent claims.

Hence, according to the present invention, there is provided a lighting device for illuminating a surface. The lighting device comprises at least one first light source configured to emit a first light beam in a first direction and at least one second light source configured to emit a second light beam in a second direction that is not parallel to the first direction. The first light beam has a first spectral power distribution, the second light beam has a second spectral power distribution and the second spectral power distribution is different from the first spectral power distribution.

The lighting device further comprises at least one light-delimiting element adjustable relative to at least one of the at least first light source and the at least second light source. The at least one light-delimiting element is further configured to delimit the first light beam and the second light beam to thereby modify an area of overlap on the surface of the first light beam and the second light beam by forming a boundary of the light separating the first light beam and the second light beam, such that the first light source is configured to illuminate at least a first region of the surface, and the second light source is configured to illuminate at least a second region adjoining the at least one first region of the surface.

Thus, the present invention is based on the idea of providing a lighting device comprising at least one light-delimiting element capable of enabling an adjustment of the position as well as an adjustment of the sharpness of a boundary of the light created between the first and second light beams emitted from the first light source(s) and the second light source(s) for illuminating adjoining regions of a surface. By the term "adjoining", it is here meant that the said two regions are next to each other such that they are being in contact at some point or line creating an area of overlap of light effects. By the term "light-delimiting element", it is here meant one or more element(s), structure(s), unit(s), or the like, which is configured to delimit and/or at least partially block the first light beam and/or the second light beam emitted by the at least one first light source or the at least one second light source. By the term "boundary of the light", it is here meant the boundary or edge between the first and second light beams, separating the first and second light beams from each other. By the term "surface", it is here meant either a single surface (e.g. a wall, a ceiling, or the like), or a plurality of surfaces (e.g. (two) separate walls, a wall and a ceiling, etc.) By the term "region of a surface", it is here meant a portion of a surface (e.g. a wall or a ceiling) which may comprise one or more corners, or having at least a non-uniform or non-flat appearance (e.g. the 90° angle formed between adjacent walls). In the case of a surface having a uniform or flat appearance (e.g. a single wall) the term "region of a surface" means a portion of said uniform surface.

The lighting device of the present invention is advantageous in that it may be used for professional applications (e.g. in spectacle venues such as theater, movies, festivals, concerts, etc.) as well as for home or personal lighting purposes. In addition, the illuminated first region(s) and second region(s) of the surface referenced above may be represented by walls, ceilings, floors or any other surface(s) on which lighting effects may be required.

It will be appreciated that the at least one first light source and the at least one second light source configured to emit the first and second light beams may be represented by, but are not limited to, LEDs (light-emitting diodes) for reasons of energy efficiency. The first and second light beams may also emit light beams that have different spectral power distribution, therefore the said light beams may differ in color and/or intensity. The present invention is further advantageous in that the first and the second light sources may comprise a plurality of lighting nodes (e.g. a plurality of LEDs) which in turn may be individually controllable. Such individual control of a plurality of lighting nodes forming the light sources allows the lighting device to generate a wider range of lighting effects, thereby rendering the present solution adaptable to an even wider range of applications. The first and second light sources according to the present invention may also provide a variable orientation of their emitted light beams. In other words, the first and the second light sources may emit light beams in different directions (e.g. non-parallel). Therefore, the light emission directions between the first the second light sources may create an angle between 0 to 180 degrees. Such variability of light beam orientation further results in the increase of the lighting effect capabilities provided by the present invention.

The present invention is further advantageous in that the at least one light-delimiting element may be connected or attached to the lighting device via a pivot. Such pivot may allow the light-delimiting element to rotate about the pivot point therefore providing the adjustability of its direction i.e. the angle which the light-delimiting element forms relative to the first and the second light source. The light-delimiting element may further have a fixed/rigid connection to the lighting device and may provide adjustable dimensions further resulting in the increase of capability of obtaining a variety of light effects. Such light effects may be generated by the delimitation or blocking of parts of the first light beam and/or the second light beam. The delimitation or at least partial blocking provided by the light-delimiting element may therefore substantially eliminate any overlapping of the first light beam and the second light beam, thus resulting in the creation of sharp and distinct edges of said first light beam and second light beam. In turn, such sharp and distinct edges further result in the attainment of a definite boundary of the light separating the first light beam emitted by the first light source(s) and the second light beam emitted by the second light source(s).

The present inventive concept is further advantageous in that the portion of the first and second light beams which is delimited or at least partially blocked by the delimiting element may represent the peripheral portion of said light beams. By the term “peripheral portion” it is here meant the outer portion of a light beam consisting of a weaker light intensity than the central portion of a light beam. Such delimitation of the edge of the first and second light beams by the light-delimiting element(s) allows for the illumination of the first region and the second region with a uniform and high intensity light. Delimiting the peripheral portion of the first light beam and the second light beam further results in the obtaining of a clear and distinct boundary of the light between said light beams as well as an increased variability of light effects.

It will be appreciated that the lighting device of the present invention furthermore comprises relatively few components. The relatively low number of components is advantageous in that the lighting device is relatively inexpensive to fabricate. Moreover, the relatively low number of components of the lighting device implies an easier recycling, especially compared to devices or arrangements comprising a relatively high number of components which impede an easy disassembling and/or recycling operation.

The use of an adjustable light-delimiting element in the lighting device as proposed by the present inventive concept therefore permits the attainment of specific and customizable light effects on different regions of a surface to be illuminated and furthermore enables the users to manipulate the light-delimiting element in such a way that the boundary of the light may be placed at a desired position on said surface.

At least one of the at least one first light source and the at least one second light source may comprise a color controllable light source, and the lighting device may be configured to control the color of the light emitted from the color controllable light source. This example has the advantage that the color controllable light sources result in a wider variety of light effects such as illuminating the first region with a first color and illuminating the second region with a second color. This example may permit the illumination of a wall (e.g. a first region of the surface) with a sunlight-like colored light whilst illuminating the ceiling (e.g. the second region of the surface) with a sky-like colored light. This example further has the advantage that the color controllable light sources allow for a different intensity of light to be emitted by the different light sources. Such difference in light intensity emitted by the first light source(s) and the second light source(s) results in the possibility of an even wider range of light effects, e.g. illuminating the first and second regions with a different light intensity.

At least one of the at least one first light source and the at least second light source may comprise a plurality of light sources arranged in a linear array. By the term “linear array” it is here meant a linear arrangement or chain of a plurality of light sources (e.g. LEDs, or other light sources which may be used in the present invention). Such linear array may further be positioned horizontally or vertically on the lighting device, depending on the dimensions of the at least first region and/or at least second region of the surface to be illuminated thus permitting a greater adaptability to particular applications and allowing the realization of greater light effects in relation to light intensity. This example further has the advantage that it allows a greater illumination coverage of the at least first region and at least second region of the surface.

The at least one light-delimiting element may have an elongated shape. The elongated shape of the light-delimiting element may represent a linear shape and may provide a sufficient length allowing the light-delimiting element to delimit and/or at least partially block the first light beam and/or the second light beam. This example further has the advantage that the elongated linear shape of the at least one light-delimiting element represents a non-complex component easily interchangeable or replaceable resulting in a greater usability of the lighting device.

The at least one light-delimiting element may have an adjustable length. This example has the advantage that it permits the adjustment of the delimitation and/or at least partial blocking of at least one of the first light beam and the second light beam. In other words, by increasing or decreasing the length of the light-delimiting element(s) permits a larger or smaller delimitation of one or more of the first light beam and the second light beam thus resulting in a wider or thinner boundary of the light between the first light beam and the second light beam. An adjustment of the boundary of the light is in turn advantageous in that it allows the lighting device to be adaptable to applications in which it is preferred that the distinct separation between different light effects involves an area that is not illuminated between the illuminated first region and the illuminated second region (e.g. when the surface comprises a portion which does not require illumination between the first and second regions). This example further has the advantage that it allows the lighting device to have a greater adaptability to the environments in which it may be operated. The adjustable length of the light-delimiting element(s) may be fully retractable within the lighting device thus permitting said lighting device to be positioned at close proximity to the surface to be illuminated. This example further has the advantage that it allows for the light-delimiting element to be less hazardous in the environment in which the lighting device is operating. Furthermore, this example increases the adaptability of the lighting device to different types of light sources and allows the one or more light-delimiting elements to affect at least one of the first light beam and the second light beam in a plurality of manners (i.e. an increase or decrease of the delimitation of the light beams) thus resulting in increased variability of light effects.

The light-delimiting element may have an adjustable width. This example has the advantage that it allows the lighting device to be adaptable to light sources comprising a linear array of a plurality of light sources, e.g. as described in a previous embodiment. The adjustable width allows the light-delimiting element to efficiently delimit and/or at least partially block the light emitted by the first light source and the second light source for any orientation of the light sources, if the light sources in fact comprise a linear array of a plurality of light sources. In addition, the adjustable width of the light-delimiting element further allows the adjustment of the sharpness or distinctiveness of the boundary of the light separating the first region of the illuminated surface from the second region of the illuminated surface. For example, a wider light-delimiting element will generate a sharper and more distinct boundary of the light and a thinner light-delimiting element will generate a less sharp boundary of the light. Such adjustable width also provides similar advantages as the ones described in relation to the previous embodiment as well as allowing the possibility of a combined effect between the present and previous embodiments. Such combined effect allows the light-delimiting element(s) to reach greater delimitation of at least one of the first light beam and the second light beam thus resulting in an increase of the lighting effect capabilities provided by the present invention.

The at least one light-delimiting element may comprise at least one portion which is light-transmissive. By the term "light transmissive", it is here meant translucent and/or transparent. The light-transmissive portion may comprise a material allowing one or both of the first light beam and the second light beam to traverse at least partially the light-delimiting element(s), resulting in different lighting effects (e.g. a lighting effect in which the boundary of the light may comprise light emitted from at least one of the first light beam and second light beam and transmitted through the light-delimiting element).

The light-transmissive portion of the light delimiting-element may have a light-transmissivity (such as a transparency) that is adjustable along the length of the light-transmissive portion. The adjustable light-transmissivity of the portion of the light delimiting-element(s) permits the generation of various light effects for which the intensity of the light transmitted through the portion of the light delimiting element differs. This example further has the advantage that the adjustable light-transmissivity of the portion allows the light-delimiting element of the lighting device to be versatile. More specifically, it may be conveniently designed to provide a desired lighting distribution in terms of illumination and/or decorative purposes thus permitting the lighting device to be adaptable to an even wider range of applications. For example, the portion of the light-delimiting element may have a light-transmissivity having a gradient varying from opaque near the first light source and/or the second light source while providing a greater light-transmissivity closest to the surface being illuminated. In this manner, the light-delimiting element allows for a gradually diminishing sharpness of the boundary of the light between two distinct light effects, i.e. the illumination of the surface generated by the first light beam and the second light beam.

The at least one light-delimiting element may be configured to reflect at least a portion of at least one of the first light beam and the second light beam. The reflective characteristic of the material forming the light-delimiting element(s) may allow the reflection of the light by total internal reflection. The term "total internal reflection", which is known by the skilled person, describes the phenomenon which occurs when a propagated light wave strikes a medium boundary at an angle larger than a particular critical angle with respect to the normal to the surface. If the refractive index is lower on the other side of the boundary and the incident angle is greater than the critical angle, the light wave cannot pass through and is entirely reflected. Such reflection of a portion of one or both of the first light beam and the second light beam further allows for a greater light intensity with which the first light beam and the second light beam illuminate the first and/or second region of the surface. This example further allows a greater light distribution of the first light beam and the second light beam. Moreover, this example has the advantage that it permits a sharper and more definite boundary of the light to be obtained as less light traverses the light-delimiting element from being reflected thereupon.

The at least one light-delimiting element may comprise at least one light source. The light source(s) may also comprise a linear light source array as described in a previous embodiment and may be positioned on the light source in such way that the light beam generated by the light source is directed within the boundary of the light separating the first light beam and the second light beam. This example has the advantage that it permits the adjustment of the boundary of the light by having the light source turned on or off during operation of the lighting device. Having the light source turned off allows a sharp boundary of the light whereas having the light source turned on allows the boundary of the light to comprise a color gradient as the transition between the color of the first light beam and the color of the second light beam. Furthermore, said transitional color gradient may be based on the color value or setting of at least one of the first light source and the second light source. The transitional color gradient may also be based on an interpolation or average of the color values of the first and second light beams and may therefore be controlled by the user (e.g. digitally) as to provide a light setting. This example therefore results in an increased variability of light effects.

The at least one first light source may be arranged on a first surface of the lighting device, and the at least one second light source may be arranged on a second surface of the lighting device, respectively, wherein the at least one light-delimiting element may be adjustably arranged at a first angle relative to the first surface and at a second angle relative to the second surface. The adjustable angular positioning relative to the first and second surfaces of the lighting device permits the light-delimiting element to provide a greater delimiting effect to the light beam or second light beam and therefore a greater effect on the definition of the boundary of the light. In other words, the efficiency of the delimitation (generated by the one or more light-delimiting elements) of at least one of the first light beam and second light beam is dependent on at least one of the first angle and the second angle. For example, a smaller value of the first angle formed between the light-delimiting element and the first surface may result in a more pronounced light delimiting and/or at least partial light blocking effect as opposed to a greater value for the same first angle. Furthermore, the one or more light-delimiting elements adjustably arranged at such first angle and second angle permits the adjustability of the positioning, the dimensioning and the sharpness of the boundary of light on the illuminated surface. This example therefore again favors the adjustability of the light effects obtained from the lighting device as well as the definition of its boundary of light.

The at least one of the first surface and the second surface may be adjustably arranged at a third angle relative to the second surface and the first surface, respectively. This example has the advantage that it also allows for the adjustability of the positioning, the dimensioning and the sharpness of the boundary of light on the illuminated surface and the adjustability of the light delimitation effect provided by the at light delimiting element(s). Furthermore, this example has the advantage that it allows the use of a fixed (i.e. non-rotating/non-adjustable) light-delimiting element whilst still providing a lighting device capable of adjusting the delimiting effect generated by the light-delimiting element as well as the positioning, the dimensioning and the sharpness of the boundary of light on the illuminated surface. Moreover, this example further permits the parallel alignment of the first surface and the second surface, thereby increasing the efficiency of light distribution for illumination and lighting effects on a surface having a flat or uniform appearance (e.g. a single wall).

The lighting device may comprise at least one third light source arranged on a third surface, wherein the third surface is opposite to one of the first surface and the second surface. The third light source(s) may also comprise a linear light source array as described in a previous embodiment. This example has the advantage that it allows for a greater light output to be emitted from the lighting device, resulting in an increased light intensity and a more efficient light distribution on the first region and the second region.

According to another aspect of the present invention, there is provided a lighting arrangement comprising the lighting device as described above, wherein the lighting arrangement further comprises a surface having at least the first region and at least the second region adjoining at a corner. The boundary of the light may be directed to the at least one corner.

This lighting arrangement has the advantage that it allows for even greater light effects. For example, the first region of the surface may be a wall and the second region of the surface may be a ceiling. The first light beam may thus illuminate the region with a different color than the color of the second light beam illuminating the second region.

The distance between the at least one first light source and the surface may be different from the distance between the at least one second light source and the surface. This has the advantage that it allows the lighting device to be adaptable to a wider range of applications in which the positioning of the lighting device in an environment and the type of surface and proximity to said surface may differ.

Further objectives of, features of, and advantages with, the present invention will become apparent when studying the following detailed disclosure, the drawings and the appended claims. Those skilled in the art will realize that different features of the present invention can be combined to create embodiments other than those described in the following.

BRIEF DESCRIPTION OF THE DRAWINGS

This and other aspects of the present invention will now be described in more detail, with reference to the appended drawings showing embodiment(s) of the invention.

DETAILED DESCRIPTION OF THE EMBODIMENTS

Figure 1A:
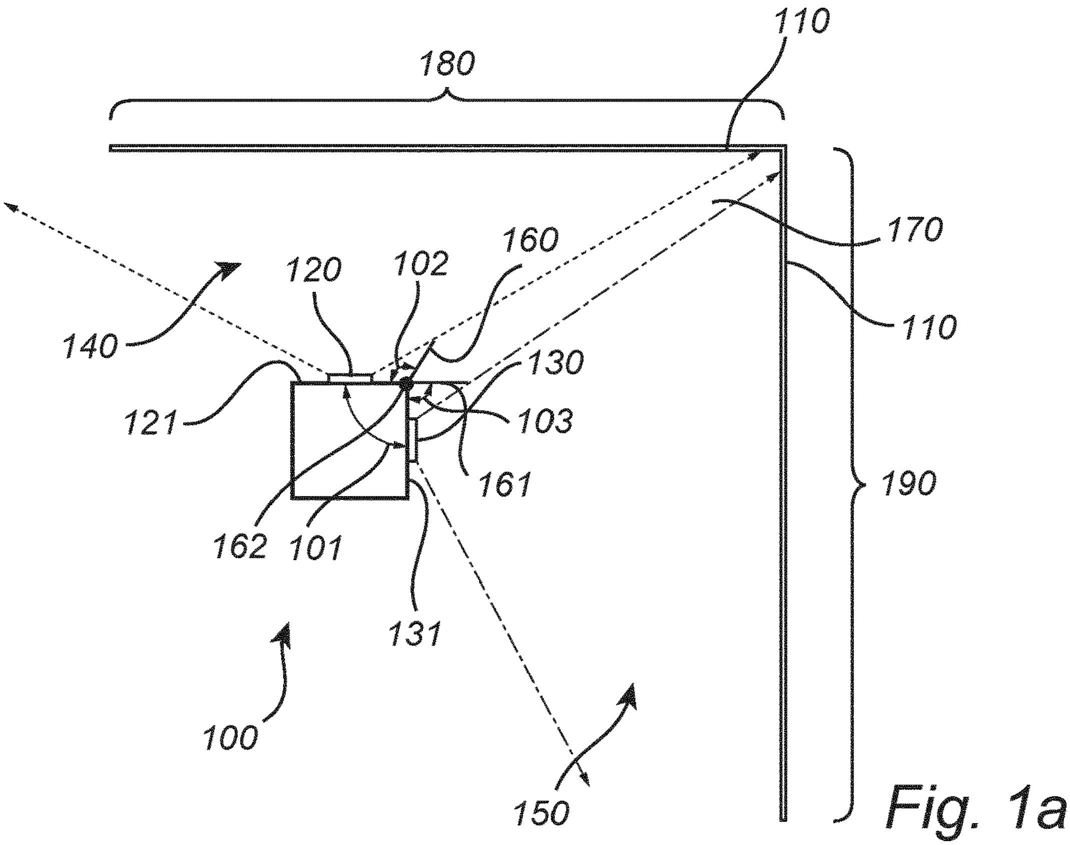
FIG. 1*a* schematically shows a lighting device according to an exemplifying embodiment of the present invention, FIG. 1*b* schematically shows a lighting device according to another exemplifying embodiment of the present invention, FIG. 2 schematically shows a lighting device according to another exemplifying embodiment of the present invention, FIG. 3 schematically shows a lighting device according to another exemplifying embodiment of the present invention, FIG. 4*a* schematically shows a lighting device according to another exemplifying embodiment of the present invention, FIG. 4*b* schematically shows an alternative lighting device, FIG. 5*a* schematically shows an alternative lighting device, FIG. 5*b* schematically shows a lighting device according to another exemplifying embodiment of the present invention, and FIG. 6 schematically shows a lighting device according to another exemplifying embodiment of the present invention.

FIG. 1*a* illustrates a lighting device 100 comprising a first surface 121 and a second surface 131 on which are respectively arranged a first light source 120 and a second light source 130. Both first and second light sources 120, 130 are color controllable light sources and both comprise linear arrays of plurality of light sources (not visible). FIG. 1*a* further depicts a first light beam 140 emitted from the first light source 120 as well as a second light beam 150 emitted from the second light source 130. The first light beam 140 is illuminating a first region 180 of a surface 110 and the second light beam 150 is shown illuminating a second region 190 of a surface 110. Both the first and second light beams 140, 150 may emit a specific color of light at a specific intensity. In FIG. 1*a*, the surface 110 comprises a corner formed between the first region 180 and the second region 190 therefore representing e.g. two perpendicular walls, e.g. of a room. FIG. 1*a* therefore represents a top view of the lighting device 100. Moreover, FIG. 1*a* illustrates a first light-delimiting element 160 and a second light-delimiting element 161 both attached to the lighting device 100 via a pivot 162. The pivot 162 positions the first and second light-delimiting elements 160, 161 between the first light source 120 and the second light source 130. The first and second light-delimiting elements 160, 161 are adjustable about the pivot 162 (i.e. they may be rotated around the pivot 162) to respectively form a first angle 102 relative to the first surface 121 and a second angle 103 relative to the second surface 131. It is to be noted that the first and second surfaces 121, 131 on which are arranged the first and second light sources 120, 130 are shown in FIG. 1*a* forming a third angle 101 of 90°. The third angle 101, which could be smaller than 90° such as e.g. 60°, preferably varies between 90° and 180°. The third angle 101 may preferably be similar, but not limited to, the angle formed between the first region 180 and the second region 190 to be illuminated by the lighting device 100. FIG. 1*a* further shows the first light-delimiting element 160 delimiting and/or partially blocking the first light beam 140 such that the edge of said first light beam 140 (on the light-delimiter 160 side) contacts the first region 180 at its corner end. The first light-delimiting element 160 may completely or partly reflect the portion of the first light beam 140 contacting said first light-delimiting element 160. Similarly, the second light-delimiting element 161 delimits and/or partially blocks the second light beam

150 such that the edge of said second light beam 150 (on the light-delimiter 160 side) contacts the second region 190 at its corner end. In the absence of the light-delimiting elements 160 and 161, the adjoining first and second regions, 180 and 190, respectively would create an overlapping area. The combination of the delimiting effects of the first and second light-delimiting elements 160, 161 on the first and second light beams 140, 150, respectively, generates the formation of a boundary of light 170 separating the first and second light beams 140, 150. The adjustable arrangement of the first and second light delimiting elements 160, 161 enables the obtaining of a sharp and distinct boundary of the light 170 for which the two edges (formed by each of the delimited edges of the first and second light beams 140, 150) converge into a definite line positioned exactly in the corner formed by the perpendicular first region 180 and second region 190. The effect of the light delimiting elements 160, 161 are such that there is no overlap between the first light beam 140 and the second light beam 150, therefore allowing a separate and possibly different light effects on the first region 180 and the second region 190. It is to be noted that the transparency and the width (both not shown) of the first and/or second light-delimiting elements 160, 161 of the lighting device 100 may also be adjusted for the purpose of attaining a greater variety of light effects and greater sharpness of the boundary of the light 170.

Figure 1B:
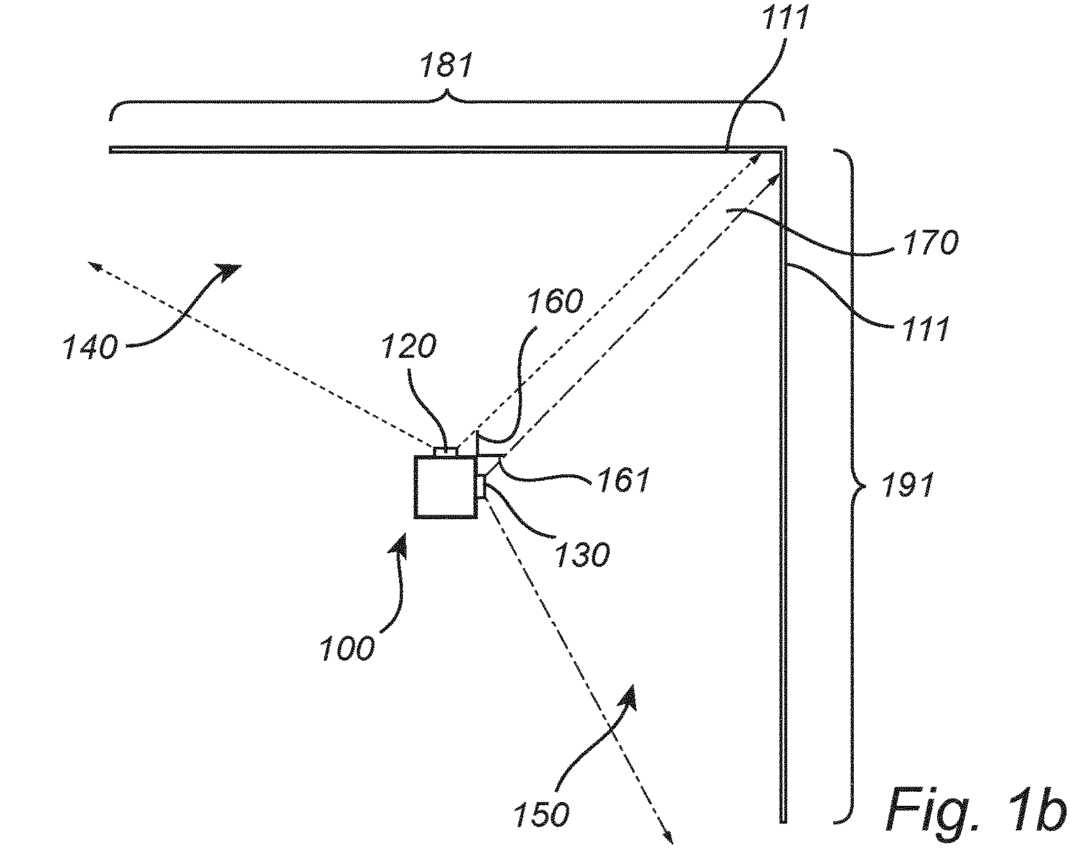

FIG. 1*b* schematically illustrates a different application of the lighting device 100 in which the first and second light-delimiting elements 160, 161 are fixedly attached between the first and second light sources 120, 130. The different lighting application shown in FIG. 1*b* illustrates a first region 181 representing a ceiling, a second region 191 representing a wall, and a surface 111 to be illuminated comprising the corner formed by such first and second regions 181, 191. FIG. 1*b* therefore illustrates a side view of the lighting device 100 which is oriented horizontally (as opposed to vertically as shown in FIG. 1*a*). In order to achieve distinct light effects on the first and second regions 181, 191, the length, width and transparency of the first and second light-delimiting elements 160, 161 may be adjusted such that the boundary of the light 170 be positioned exactly in the corner formed by the first and second regions 181, 191.

Figure 2:
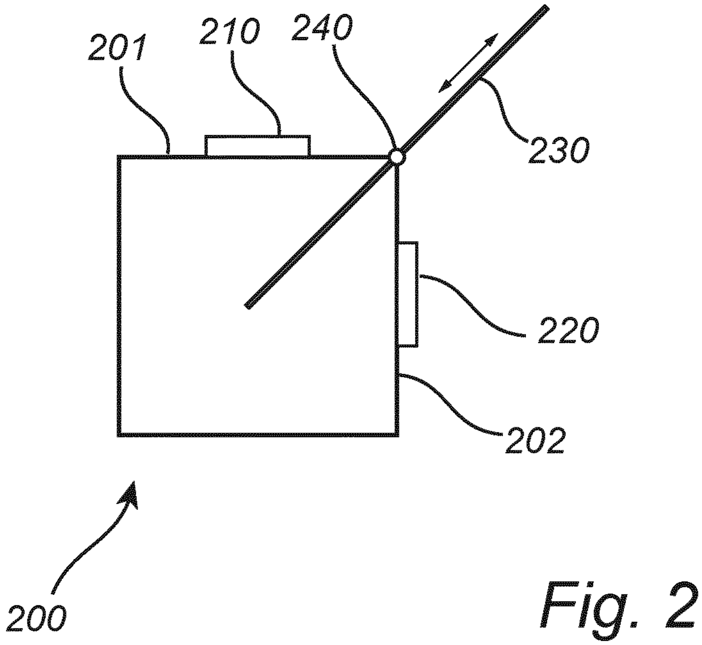

FIG. 2 schematically illustrates a lighting device 200 comprising a first surface 201 and a second surface 202 on which is arranged a first light source 210 and a second light source 220, respectively. The first and second light sources 210, 220 may be color controllable light sources and may comprise linear arrays of plurality of light sources (not visible). The lighting device 200 further comprises a single light-delimiting element 230 having an elongated shape and being attached to said lighting device 200 via a pivot 240. The pivot 240 positions the light-delimiting element 230 between the first light source 210 and the second light source 220 and allows it to be adjustable about its axis (i.e. the light-delimiting element 230 may be rotated around the pivot 240). Furthermore, the light-delimiting element 230 shown in FIG. 2 has an adjustable length. The length may be increased or decreased by elongating or retracting the light-delimiting element 230 in the directions indicated by the arrows. The light-delimiting element 230 may be elongated to its full length as to maximize the delimiting effect of said light-delimiting element 230. The light-delimiting element 230 may also be retracted completely within the lighting device 200. The adjustment of the length of the light-delimiting element 230 and/or its rotation about the pivot 240 permits the definition of a clear boundary of the light (not shown) and allow the different light effects to be obtained on different regions of an illuminated surface (not shown).

Figure 3:
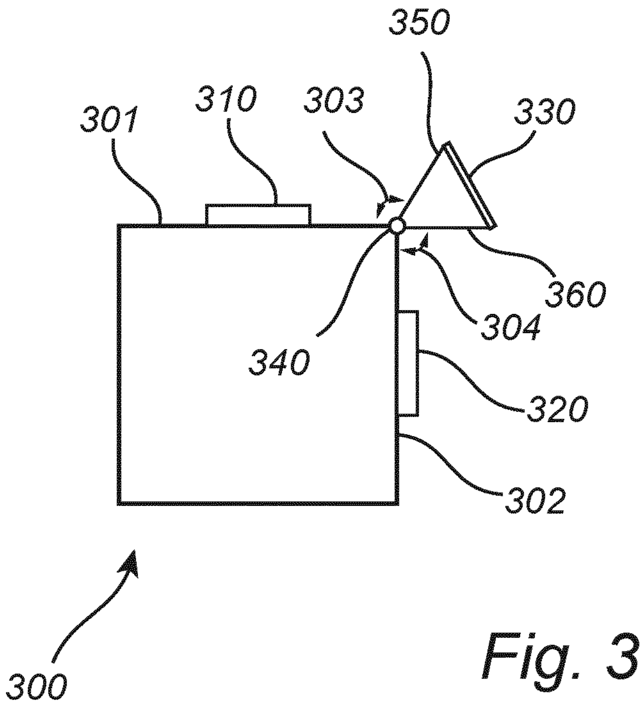

FIG. 3 illustrates a lighting device 300 comprising a first surface 301 and a second surface 302 on which is arranged a first light source 310 and a second light source 320, respectively. The first and second light sources 310, 320 may be color controllable light sources and may comprise linear arrays of plurality of light sources (not visible). FIG. 3 further illustrates a first light-delimiting element 350 and a second light-delimiting element 360 both attached to the lighting device 300 via a pivot 340. The pivot 340 positions the first and second light-delimiting elements 350, 360 between the first light source 310 and the second light source 320. The first and second light-delimiting elements 350, 360 are adjustable about the pivot 340 (i.e. they may be rotated around the pivot 340) to respectively form a first angle 303 relative to the first surface 301 and a second angle 304 relative to the second surface 302. Furthermore, the first and second light-delimiting elements 350, 360 comprise an additional light source 330 attached to and positioned between both the first and second light-delimiting elements 350, 360. The additional light source 330 may comprise a linear array of a plurality of color controllable light sources, and may be positioned such that its light beam (not shown) is oriented within the boundary of the light formed between the delimited light beam of the first light source 310 and the delimited light beam of the second light source 320. In other words, the light beam of the additional light source 330 is configured to illuminate the boundary of the light and to overlap with a portion of the delimited side of the light beams of both the first and second light sources 310, 320. It is to be noted that the lighting device 300 may operate with the additional light source 330 turned on or turned off. This activation and deactivation of said additional light source 330 therefore enable users to alternate between a sharp and distinct boundary of the light when the additional light source 330 is turned off and a color gradient transitioning between the delimited light beam of the first light source 310 and the delimited light beam of the second light source 320 when the additional light source 330 is turned on (not shown).

Figure 4A:
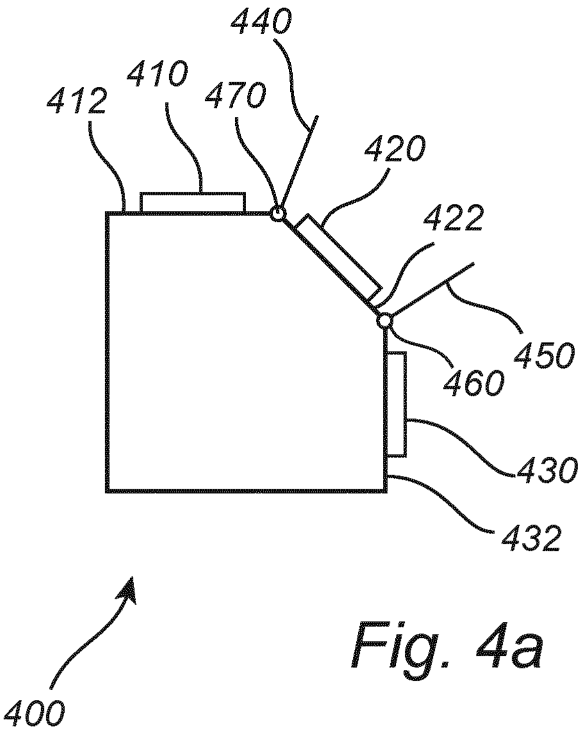
Figure 4B:
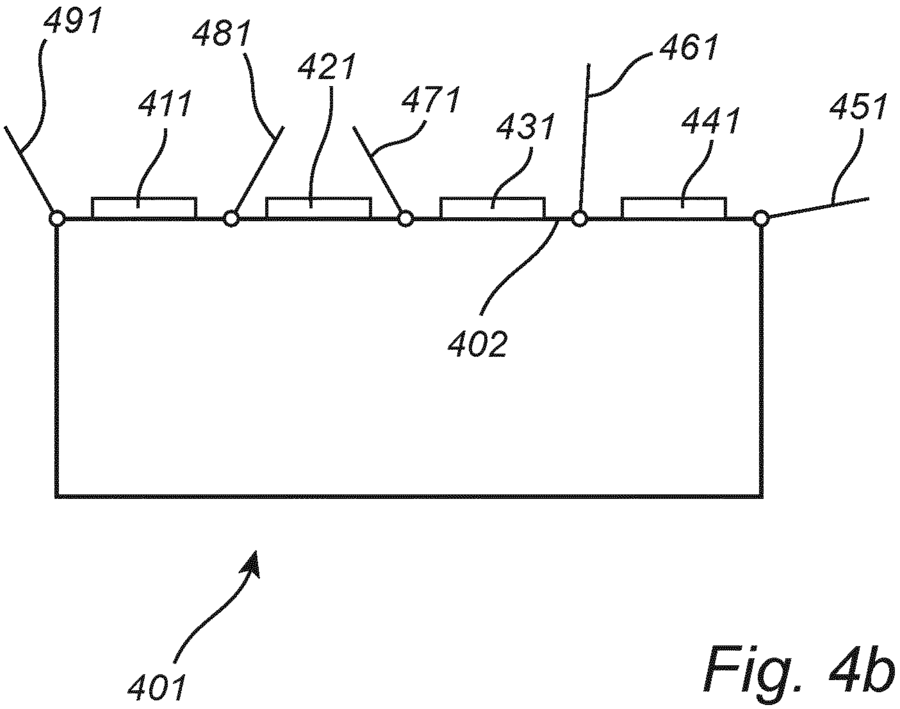

FIGS. 4*a* and 4*b* schematically illustrate lighting devices comprising more than two light sources separated by intermediate light-delimiting elements. FIG. 4*a* shows a lighting device 400 comprising a first surface 412, a second surface 422 and a third surface 432 on which are respectively arranged a first light source 410, a second light source 420 and a third light source 430. One or more of the light sources 410, 420, 430 may be color controllable light sources and may comprise linear arrays of plurality of light sources (not visible). The first and second surfaces 412, 422 are separated by a first light delimiting element 440 attached to the lighting device 400 via a first pivot 470. The first pivot 470 positions the first light-delimiting element 440 between the first light source 410 and the second light source 420. In addition, the first light-delimiting element 440 is adjustable about the first pivot 470 as to delimit the light beams emitted by the first and second light sources 410, 420. Similarly to the above description, the second light delimiting element 450 attached to and adjustable about the second pivot 460 generates a delimiting effect on the light beams emitted by the second and third light sources 420, 430. The lighting device 400 as depicted in FIG. 4*a* may thus be used for similar applications as the lighting device 300 shown in FIG. 3, i.e. enabling users to alternate between a sharp and distinct boundary of the light when the second light source

420 is turned off and a color gradient transitioning between the delimited light beam of the first light source 410 and the delimited light beam of the third light source 430 when the second light source 420 is turned on (not shown). The lighting device 400 may further be used for applications requiring the illumination three regions of a surface with different light effects. In such case, the angle formed between the second surface 422 and the first surface 412 and the angle formed between the second surface 422 and the third surface 432 may be adjustable depending on the angle formed between the regions to be illuminated.

FIG. 4*b* shows an alternative lighting device 401 comprising a single surface 402 on which a plurality of light sources 411, 421, 431, 441 are arranged. The light sources presented in FIG. 4*b* are respectively separated by light-delimiting elements 451, 461, 471, 481, 491 attached to the lighting device 401 via pivots and positioned between each light source 411, 421, 431, 441 as well as at both ends of the surface 402. The adjustment of the different light-delimiting elements 451, 461, 471, 481, 491 about their respective pivots as well as the adjustments of their respective length, width and transparency allow the delimitation of the light beams emitted by each light source 411, 421, 431, 441 to generate distinctive light effects on as many different regions of a surface as there are light sources (i.e. four different regions for the application shown in FIG. 4*b*).

Figure 5A:
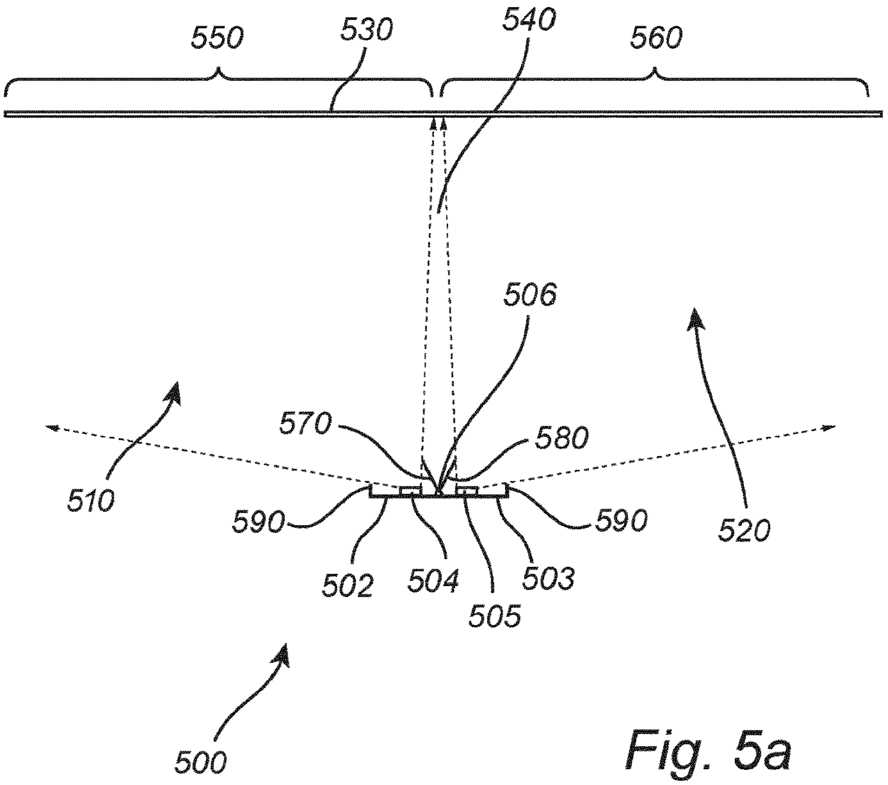
Figure 5B:
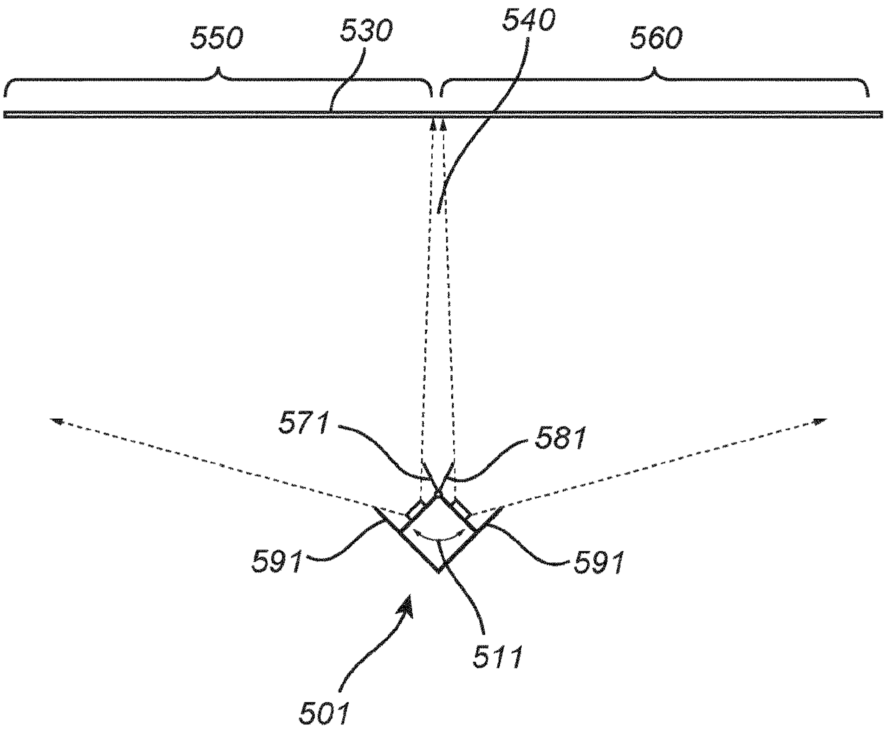

FIGS. 5*a* and 5*b* schematically illustrates scenarios in which the surface 530 to be illuminated represents a flat or uniform surface (i.e. there is an absence of angles or corners formed by the different regions of the surface). FIG. 5*a* further shows a lighting device 500 comprising a first surface 502 and a second surface 503 on which are respectively arranged a first light source 504 and a second light source 505. Both first and second light sources 504, 505 are color controllable light sources and both comprise linear arrays of plurality of light sources (not visible). FIG. 5*a* further depicts a first light beam 510 emitted from the first light source 504 as well as a second light beam 520 emitted from the second light source 505. The first light beam 510 is illuminating the first region 550 of the surface 530 and the second light beam 520 is shown illuminating the second region 560 of the surface 530. In addition, both the first and second light beams 510, 520 may emit a specific color of light at a specific intensity. FIG. 5*a* further illustrates a first light-delimiting element 570 and a second light-delimiting element 580, which are both attached to the lighting device 500 via a pivot 506 positioned between the first and second light sources 504, 505. The adjustments of the first and second light-delimiting elements 570, 580, and consequently the light delimiting effect and boundary of the light 540 generated by said first and second light-delimiting elements 570, 580 is similar to the description used in FIG. 1*a*. FIG. 5*a* further shows that the first surface 502 and the second surface 503 are parallel. In other words, the angle formed between the first surface 502 and the second surface 503 is 180°. By the first and second light sources 504, 505 being arranged on parallel surfaces 502, 503 facing the first and second regions 550, 560 to be illuminated enables the lighting device 500 to reach an efficient light distribution on the flat or uniform surface 530 with a greater light intensity of the first and second light beams 510, 520. FIG. 5*a* further depicts two fixed light-delimiting elements 590 rigidly attached and positioned at opposite ends of the first and second surface 502, 503 delimiting the outer edges of the first and second light beams 510, 520.

FIG. 5*b* illustrates an alternative lighting device 501 operating in the same application as the one depicted in FIG. 5*a*, and it is also referred to FIG. 5*a* for an increased understanding. In FIG. 5*b*, however, the lighting device 501 comprises an angle 511 which is smaller than 180°. This illustrates the adjustability of the light effects on the first and second regions 550, 560 of the flat or uniform surface 530. FIG. 5*b* also depicts a combination of rigidly attached light-delimiting elements 591 with adjustable light-delimiting elements 571, 581 as described in FIG. 5*a*.

Figure 6:
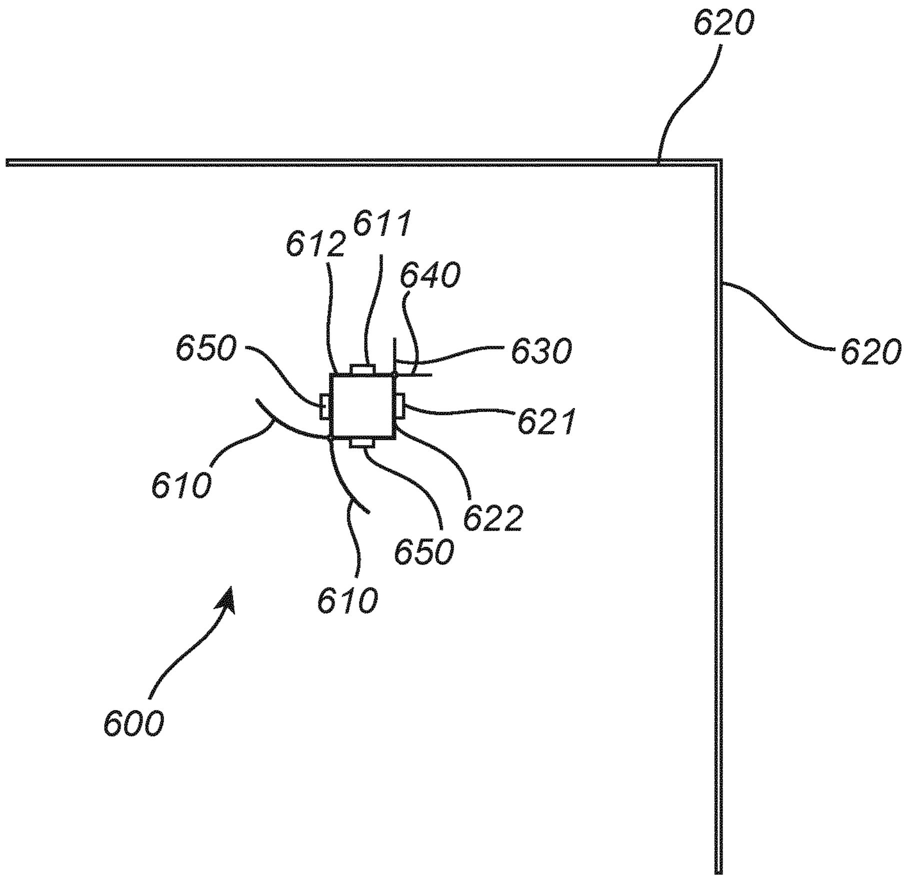

FIG. 6 schematically illustrates a lighting device 600 comprising a first surface 612 and a second surface 622 on which are respectively arranged a first light source 611 and a second light source 621 configured to emit respective light beams (not shown) on the surface 620. The lighting device 600 further comprises a first light-delimiting element 630 and a second light-delimiting element 640. At least one of the first and second light-delimiting elements 630, 640 is adjustably attached to the lighting device 600 via a pivot and comprises the same characteristics as the light-delimiting elements described and shown in FIG. 1*a*. The lighting device 600 further comprises two supporting light sources 650 arranged on opposite surfaces with respect to the first and second surfaces 612, 622. FIG. 6 further shows light reflectors 610 made of a reflective material and arranged to partially cover the supporting light sources 650, in order to reflect at least a portion of the light beams emitted from said supporting light sources 650. The reflectors 610 therefore reflect and redirect the light emitted from the supporting light sources 650 towards the regions of the surface 620 to be illuminated, thereby providing a greater light output to be emitted from the lighting device 600.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. A lighting device for illuminating a surface, the lighting device comprising:

a first light source configured to emit a first light beam in a first direction, wherein the first light beam has a first spectral power distribution, a second light source configured to emit a second light beam in a second direction that is not parallel to the first direction, wherein the second light beam has a second spectral power distribution and wherein the second spectral power distribution is different from the first spectral power distribution, and a light-delimiting element adjustable relative to at least one of the first light source and the second light source, wherein the light-delimiting element is configured to delimit the first light beam and the second light beam to thereby modify an area of overlap on the surface of the first light beam and the second light beam by forming a boundary of the light separating the first light beam and the second light beam, such that the first light source is configured to illuminate a first region of the surface, and the second light source is configured to illuminate a second region of the surface, the second region adjoining the first region.

2. The lighting device according to claim 1, wherein at least one of the first light source and the second light source comprises a color controllable light source.

3. The lighting device according to claim 1, wherein at least one of the first light source and the second light source comprises a plurality of light sources arranged in a linear array.

4. The lighting device according to claim 1, wherein the light-delimiting element has an elongated shape.

5. The lighting device according to claim 1, wherein the light-delimiting element has an adjustable length.

6. The lighting device according to claim 1, wherein the light-delimiting element has an adjustable width.

7. The lighting device according to claim 1, wherein the light-delimiting element comprises a light-transmissive portion.

8. The lighting device according to claim 7, wherein the light-transmissive portion has a light-transmissivity that is adjustable along a length of the light-transmissive portion.

9. The lighting device according to claim 1, wherein the light-delimiting element is configured to reflect at least a portion of at least one of the first light beam and the second light beam.

10. The lighting device according to claim 1, wherein the light-delimiting element comprises at least one light source.

11. The lighting device according to claim 4, wherein the first light source is arranged on a first surface of the lighting device, wherein the second light source is arranged on a second surface of the lighting device, and wherein the light-delimiting element is adjustably arranged at a first angle relative to the first surface and at a second angle relative to the second surface.

12. The lighting device according to claim 11, wherein at least one of the first surface and the second surface is adjustably arranged at a third angle relative to the second surface and the first surface, respectively.

13. The lighting device according to claim 11, further comprising at least one third light source arranged on a third surface, wherein the third surface is opposite to one of the first surface and the second surface.

14. A lighting arrangement comprising a lighting device according to claim 1, wherein the lighting arrangement further comprises a surface having the first region and the second region adjoining at a corner, and wherein the boundary of the light is directed to the corner.

15. The lighting arrangement according to claim 14, wherein the distance between the first light source and the surface is different from a distance between the second light source and the surface.

* * * * *